US012583198B2

(12) United States Patent
Cardoso

(10) Patent No.: US 12,583,198 B2
(45) Date of Patent: Mar. 24, 2026

(54) BLANK JOINING MODULE WITH REGISTER CONTROL

(71) Applicant: BOBST MEX SA, Mex (CH)

(72) Inventor: Bryan Cardoso, Pully (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/874,863

(22) PCT Filed: Jun. 30, 2023

(86) PCT No.: PCT/EP2023/067980
§ 371 (c)(1),
(2) Date: Dec. 13, 2024

(87) PCT Pub. No.: WO2024/003341
PCT Pub. Date: Jan. 4, 2024

(65) Prior Publication Data
US 2025/0360684 A1 Nov. 27, 2025

(30) Foreign Application Priority Data
Jun. 30, 2022 (EP) .................................... 22182346

(51) Int. Cl.
*B31B 50/00* (2017.01)
*B31B 50/04* (2017.01)
*B65H 9/10* (2006.01)
*B31B 105/00* (2017.01)

(52) U.S. Cl.
CPC .......... *B31B 50/006* (2017.08); *B31B 50/005* (2017.08); *B31B 50/042* (2017.08); *B31B 50/044* (2017.08); *B65H 9/10* (2013.01); *B31B 2105/00* (2017.08)

(58) Field of Classification Search
CPC ... B31B 50/006; B31B 50/005; B31B 50/044; B31B 50/042; B31B 2105/00; B65H 9/10
USPC ........................................................... 493/52
See application file for complete search history.

(56) References Cited

U.S. PATENT DOCUMENTS 5,224,919 A * 7/1993 Walsh ..................... B31B 50/00 493/110
2002/0077236 A1* 6/2002 Chalendar ............... B31B 50/00 493/19

FOREIGN PATENT DOCUMENTS

EP 2072241 A2 6/2009
JP 2012213874 A 11/2012

* cited by examiner

*Primary Examiner* — Jacob A Smith
(74) *Attorney, Agent, or Firm* — Bookoff McAndrews, PLLC

(57) ABSTRACT

The present invention relates to a blank joining module for a converting machine. The blank joining module comprises an upper feeder device configured to feed and transport an upper blank (2*b*) and a lower blank (2*a*) towards a junction point (J) where the upper blank is superposed onto the lower blank. The blank joining module comprises a register control system comprising a sensing system and a position correction device (86) configured to displace the upper blank to be aligned to the lower blank.

15 Claims, 13 Drawing Sheets

BLANK JOINING MODULE WITH REGISTER CONTROL

CROSS-REFERENCE TO RELATED APPLICATION(S)

This application is a National Stage Application under 35 U.S.C. § 371 of International Application No. PCT/EP2023/067980, filed on Jun. 30, 2023, which claims priority to European Application No. 22182346.1, filed on Jun. 30, 2022, the entireties of which are incorporated herein by reference.

FIELD OF THE INVENTION

The present invention relates to a converting machine for producing paper and cardboard containers, such as folding boxes. In particular, it relates to blank joining module configured to join two blanks before folding the blanks in unison.

BACKGROUND

Converting machines such as folder-gluers are used in the production of packaging items such as paperboard and cardboard boxes. These machines comprise a plurality of workstations which may fold and glue blanks to form boxes and then count, stack and condition the boxes into batches.

Folder-gluer machines can be configured to produce many different types of packaging containers and folding boxes. One type of boxes which is composed from two blanks joined together is often referred to as a "shelf-ready" box. The shelf-ready box comprises an outer carton and an inner carton glued together. The inner carton may serve as a container for the item to be stored, while the outer carton may serve as protection during transportation. This type of box is frequently used in supermarkets and shops, where the inner carton is placed on a shelf with the items left inside.

When producing boxes from several blanks joined together, a blank joining module with a double feeder is needed. Specifically, a first and a second blanks each need a dedicated feeder.

An example of a blank joining module is described in document EP2072241. As the composed boxes is an assembly of two different blanks, there is a need to ensure that the blanks are correctly aligned before they are joined together.

To control the alignment, the blank joining module in EP2072241 comprises upper and lower cleat belts provided with abutments to control the positions of both the first and the second blanks.

US2002077236 discloses an alignment device configured to align insert sheets and blanks in relation to each other. The insert sheets are transported along a separate transportation path until the insert sheets and blanks are joined together.

An alignment is achieved by detecting the positions of each blank and insert sheet. A displacement to the insert sheet is then provided to either advance or delay the arrival of the insert sheet such that it is aligned with the blank. The displacement is provided by a conveyor belt which is configured to perform an acceleration or deceleration to each insert sheet, depending on if each particular insert sheet arrives to the sensor with an advance or a delay.

SUMMARY

In view of the prior art, it is an object of the present invention to provide a register control system configured to provide an accurate register correction while maintaining a high production speed.

This object is solved by a blank joining module according to claim 1.

According to a first aspect of the present invention, there is provided a blank joining module comprising an upper feeder device configured to feed an upper blank, a lower feeder device configured to feed a lower blank, and an upper conveyor system configured to transport the upper blank from the upper feeder device, and a lower conveyor system configured to transport the lower blank from the lower feeder device, the upper and lower conveyor systems being configured to transport the upper and lower blanks towards a junction point where the upper blank is positioned onto the lower blank, The blank joining module comprising a register control arrangement comprising a sensing system and a position correction device. The sensing system comprises an upper transfer sensor configured to detect the passage of the upper blank and a lower transfer sensor configured to detect the passage of the lower blank, The register control arrangement further comprises a control unit and a memory, the control unit being configured to receive detection signals from the upper and lower transfer sensors and calculate a total relative total displacement between the upper blank and the lower blank, the control unit being further configured to activate the position correction device to provide a correction displacement in the direction of transportation to the upper blank such that the upper blank is displaced to be aligned to the lower blank.

The invention is based on a realization that by only correcting the position of the upper blank, the production speed as defined by the lower blank can be maintained. In a preferred embodiment, only the position of the upper blank is corrected. Consequently, the position of the lower blank is not corrected.

The total relative displacement is the displacement of the upper blank in relation to the actual position of the lower blank and in relation to the predefined assembly position of the upper and lower blanks in the direction of transportation. The total relative displacement is determined by the detection times at the passage of the leading edges of the upper and lower blank at each respective transfer sensor.

The actual position of the lower blank may thus be taken as a reference position for the upper blank and the position correction device is configured to provide a correction displacement such that the upper blank is aligned with the lower blank in the junction point.

The direction of transportation can be defined as a horizontal direction extending from the upper and lower feeder devices to the junction point. The direction of transportation preferably coincides with the longitudinal direction of the converting machine. The direction of transportation extends between an inlet and an outlet of the converting machine. The direction of transportation may thus extend all the way from the upper and lower feeder devices to a folding and gluing module of the converting machine, and further downstream to a delivery module of the converting machine.

Upstream of the junction point, the transportation path of the upper blank is downwardly sloping. For the lower blank, the transportation path upstream of the junction point may be horizontal, or with a deviation of about 15°.

The term "upstream in the direction of transportation" means in a direction from the junction point J to the upper feeder device. The term "downstream in the direction of transportation" means in a direction from the upper feeder device to the junction point J.

The correction displacement corresponds to the relative total displacement. The displacement is provided by an acceleration or deceleration of the upper blank.

The memory preferably contains instructions for performing the calculation and a transitional memory for storing the total relative total displacement of each blank present between the feeder unit and the junction point.

The upper conveyor system may comprise an alignment conveyor and a register conveyor.

Preferably, the upper blank is conveyed with a selected displacement distance, such that each upper blank is displaced in relation to a predefined register position of the upper blank.

In a preferred embodiment, the selected displacement distance is selected such that each upper blank always arrive at the location of the upper transfer sensor with a total relative displacement, in relation to the lower blank and wherein the position of each upper blank is corrected with the position correction device.

In an embodiment, the selected displacement distance is selected such that each upper blank needs a correction in the same direction in the upper transportation path. The same direction means that each upper blank is corrected such that it is provided with a displacement in a direction upstream or downstream in the upper transportation path and in relation to the direction of transportation.

In an embodiment, the lower transfer sensor is configured to detect the actual position of the lower blank before the upper transfer sensor detects the actual position of the upper blank.

This allows the control unit to first determine the reference position from the position of the lower blank.

Preferably, only the position of the upper blank is corrected.

In an embodiment, the lower transfer sensor is configured to detect the actual position of the lower blank before the upper transfer sensor detects the actual position of the upper blank.

In an embodiment, the position correction device comprises a housing shroud provided with an extension which extends further upstream in the direction of transportation than the cleat belt, and wherein the upper transfer sensor is located on said protruding extension.

In an embodiment, the actual speed of the upper blank is different from the actual speed of the lower blank.

In another embodiment, the release timing of the upper blank or the actual transportation speed of the upper blank is selected such that the upper blanks are provided with a selected displacement in relation to the register position of the upper blank.

In an embodiment, the position correction device comprises a cleat belt provided with at least one abutment, and wherein the control unit is configured to either position the abutment to abut against the front edge or the rear edge of the upper blank such as to modify the position of the upper blank in the direction of transportation.

The memory preferably comprises a first set of operating instructions for a first operating mode, in which the position correction device is configured to abut against the rear edge of the upper blank such that each upper blank is accelerated by the position correction device, and a second set of instructions for a second operating mode in which the position correction device is configured to abut against the front edge of the upper blank, such that each blank is decelerated by the position correction device to reach the desired position. The acceleration or deceleration allows the upper blank to reach its desired position.

In an embodiment, the position correction device is connected to a displacement mechanism attached to a structural frame of the blank joining module, and wherein the position correction device is displaceable in the direction of transportation such that the position correction device can be moved to a first operating position in the first operating mode and to a second operating position in the second operating mode.

The displacement mechanism comprises a motor and a slide mechanism, and wherein the control unit is configured to actuate to motor to displace the position correction device according to the longitudinal length of the upper blank and the type of correction mode selected. The slide mechanism may comprise a slide rail and a slider.

In an embodiment, the register control arrangement further comprises an upper feed sensor and a lower feed sensor configured to detect the respective passage of the upper blank and the lower blank, and wherein the control unit is configured to determine an initial relative feeder displacement from the difference in detection times, and wherein the control unit is configured to issue a warning signal if the initial relative feeder displacement is higher than a correction threshold.

In an embodiment, the upper conveyor system comprises an alignment conveyor and a register conveyor, and wherein the upper alignment conveyor is connected to the register conveyor and an upper feeder, wherein the upper feeder is movable in the longitudinal direction and wherein the upper alignment conveyor is provided with a variable length.

In an embodiment, the control unit is configured to modify the release time and/or the transportation speed of the upper blank based on the length of the upper alignment conveyor.

BRIEF DESCRIPTION OF THE DRAWINGS

The invention will now be described with reference to the appended drawings, in which like features are denoted with the same reference numbers and in which.

DETAILED DESCRIPTION

Figure 1:
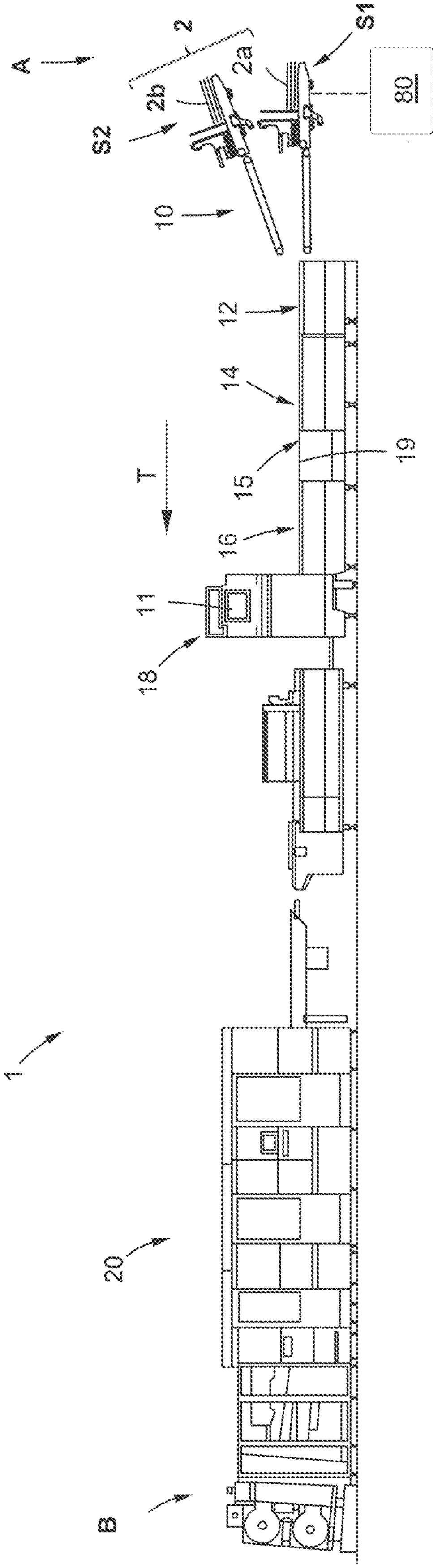
FIG. 1 is a schematic view of a converting machine in the configuration of a folder gluer.

Referring to the figures and in particular to FIG. 1 which illustrates a converting machine 1 in the form of a folder-gluer machine 1. The folder-gluer machine 1 is configured to receive a first stack S1 and a second stack S2 of blanks 2, join them and then fold and glue them together to form folding boxes 2' or other composed packaging containers.

Figure 2B:
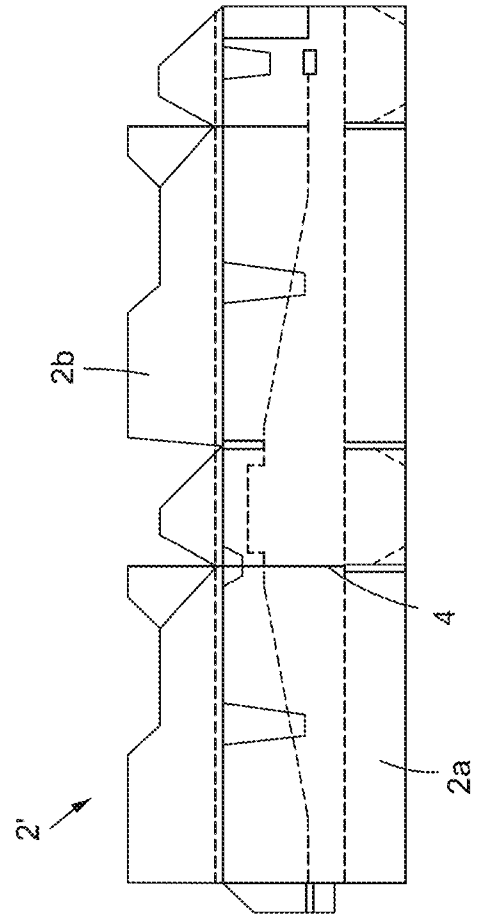
FIG. 2*b* is a planar view of composed blank for producing the folding box of FIG. 2*a;*
Figure 2A:
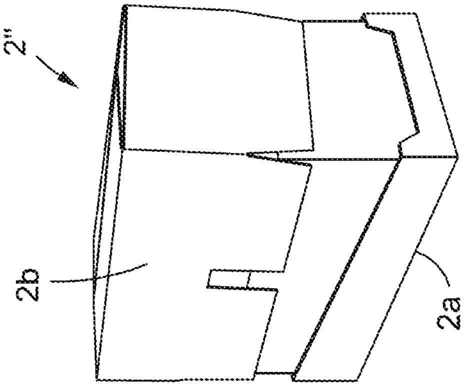
FIG. 2*a* is schematic perspective view of a folding box in the configuration of a shelf-ready box.

There are several types of boxes 2" and packaging containers and boxes which can be produced in a folder-gluer machine 1. One type of such a box 2" is illustrated in FIGS. 2*a* and 2*b* and is often referred to as a "shelf-ready" boxes 2". This type of box 2" is composed from two blanks 2*b*, 2*a* joined together. One blank 2*a* may form an inner container and the other blank 2*b* may form the outer container. In use, the outer container can be manually removed while the inner container is holding the items to be stored.

This type of composed boxes 2" is produced by first forming a composed blank 2' from a first blank 2*a* and a second blank 2*b* in the folder-gluer machine 1. Subsequently, the composed blank 2 undergoes a folding and gluing operation.

As illustrated in FIG. 1, the present folder-gluer machine 1 comprises a series of different workstations in the form of modules. The modules may include, from an inlet A to an outlet B: a blank joining module 10, a fold pre-breaking module 12, a gluing module 14 and a folding module 16. The folder-gluer machine 1 may further comprise a main user interface 11 and a quality control system 18. After the gluing and folding modules, a delivery module and conditioning section 20 can be provided in order to count and separate a shingled stream of folding boxes 2" into separate batches. The converting machine 1 further comprises a conveyance system 19 comprising conveyors such as endless belts and rollers configured to transport the first and second blanks 2*a*, 2*b* in a direction of transportation T. The converting machine 1 also comprises a control circuitry 80 configured to control the operation of the blank-joining module 10.

Figure 3:
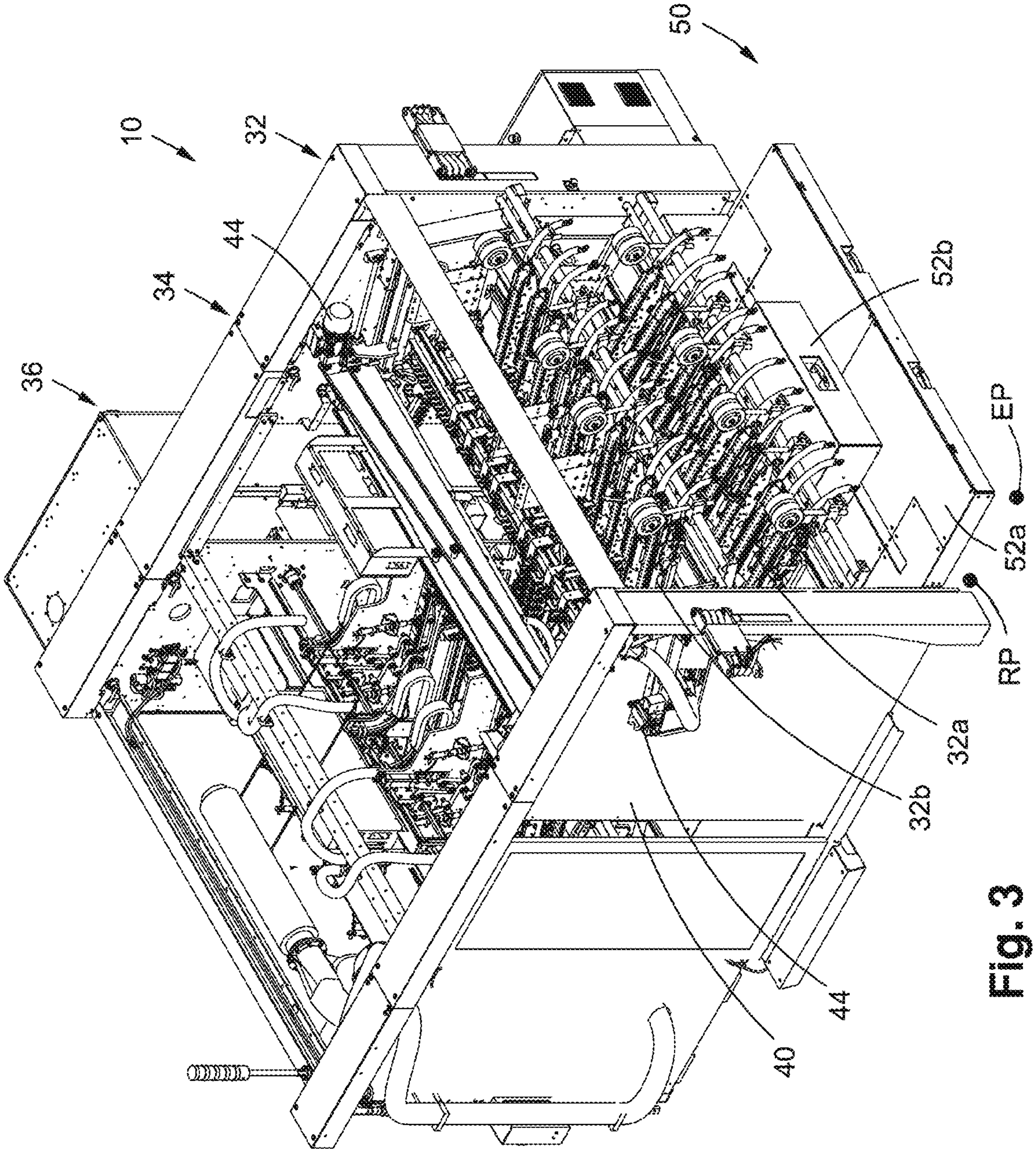
FIG. 3 is a schematic perspective view of a blank-joining module according to an embodiment of the present invention.
Figure 4:
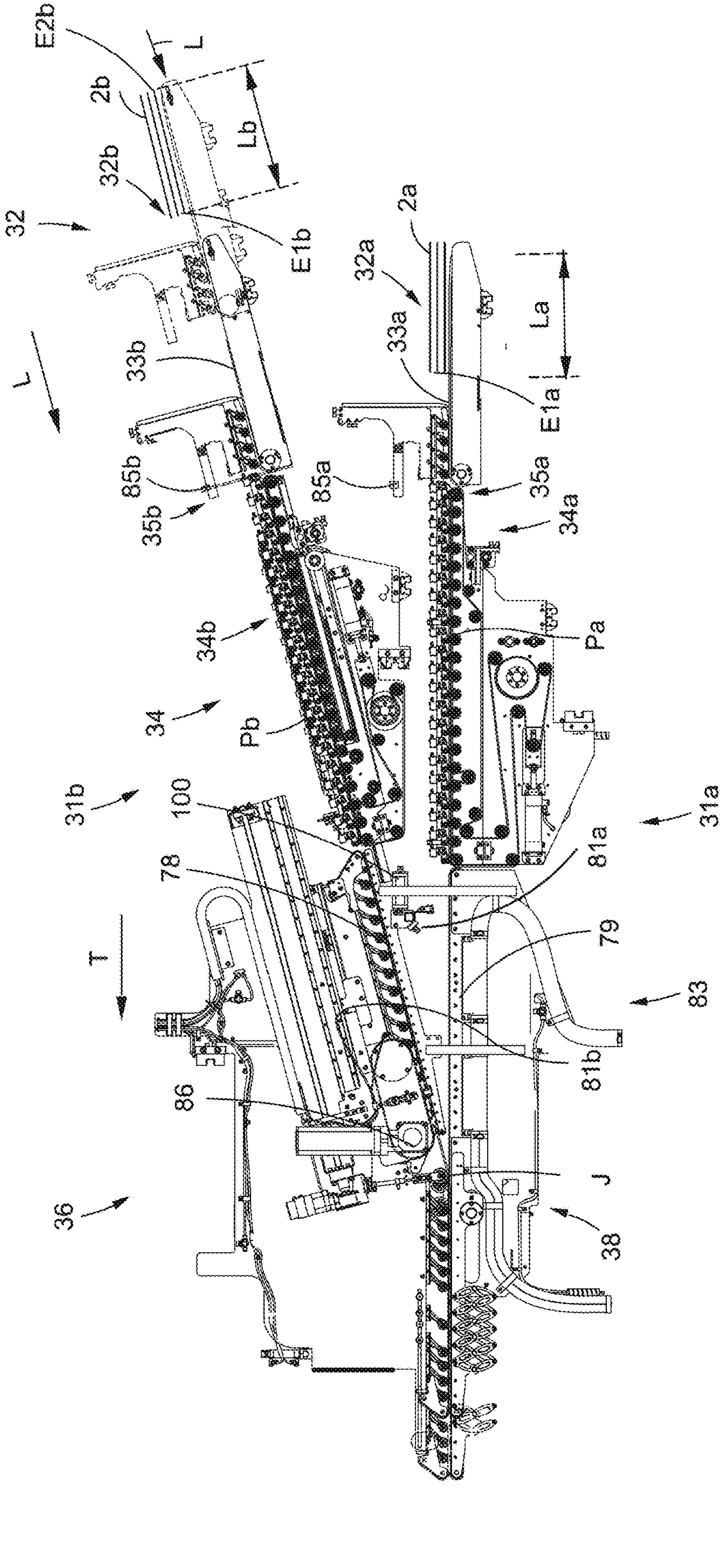
FIG. 4 is a cross-sectional view of the blank-joining module of FIG. 3.

The blank joining module 10 enables the folder-gluer 1 to produce the composed blank 2'. As illustrated in FIGS. 3 and 4, the blank joining module 10 comprises a feeder unit 32, an alignment unit 34, a gluing device 100, a register control arrangement 36, and a joining transfer 38.

As best seen in FIGS. 3 and 4, the feeder unit 32 comprises a lower feeder device 32*a* and an upper feeder device 32*b*. The upper and lower feeder devices 32*b*, 32*a* are configured to respectively feed the blanks 2*a*, 2*b* one by one in the direction of transportation T.

The upper feeder device 32*b* is configured to feed a first blank 2*b*, also referred to as an "upper blank" 2*b*, from a stack positioned on an upper loading surface 33*b*. The lower feeder device 32*a* is configured to feed a second blank 2*a*, also referred to as a "lower blank" 2*a* from a stack positioned on a lower loading surface 33*a* in the lower feeder device 32*a*.

The upper loading surface 33*b* is located vertically above the lower loading surface 33*a*. To facilitate the access to the upper loading surface 33*b*, the upper feeder device 32*b* can be displaceable in a longitudinal direction L and in the direction of transportation T1. In such a way, the upper loading surface 33*b* can be displaced into a horizontally offset position in relation to the lower loading surface 33*a*. The upper loading surface 33*b* can thus be moved closer to a machine operator.

Figure 5:
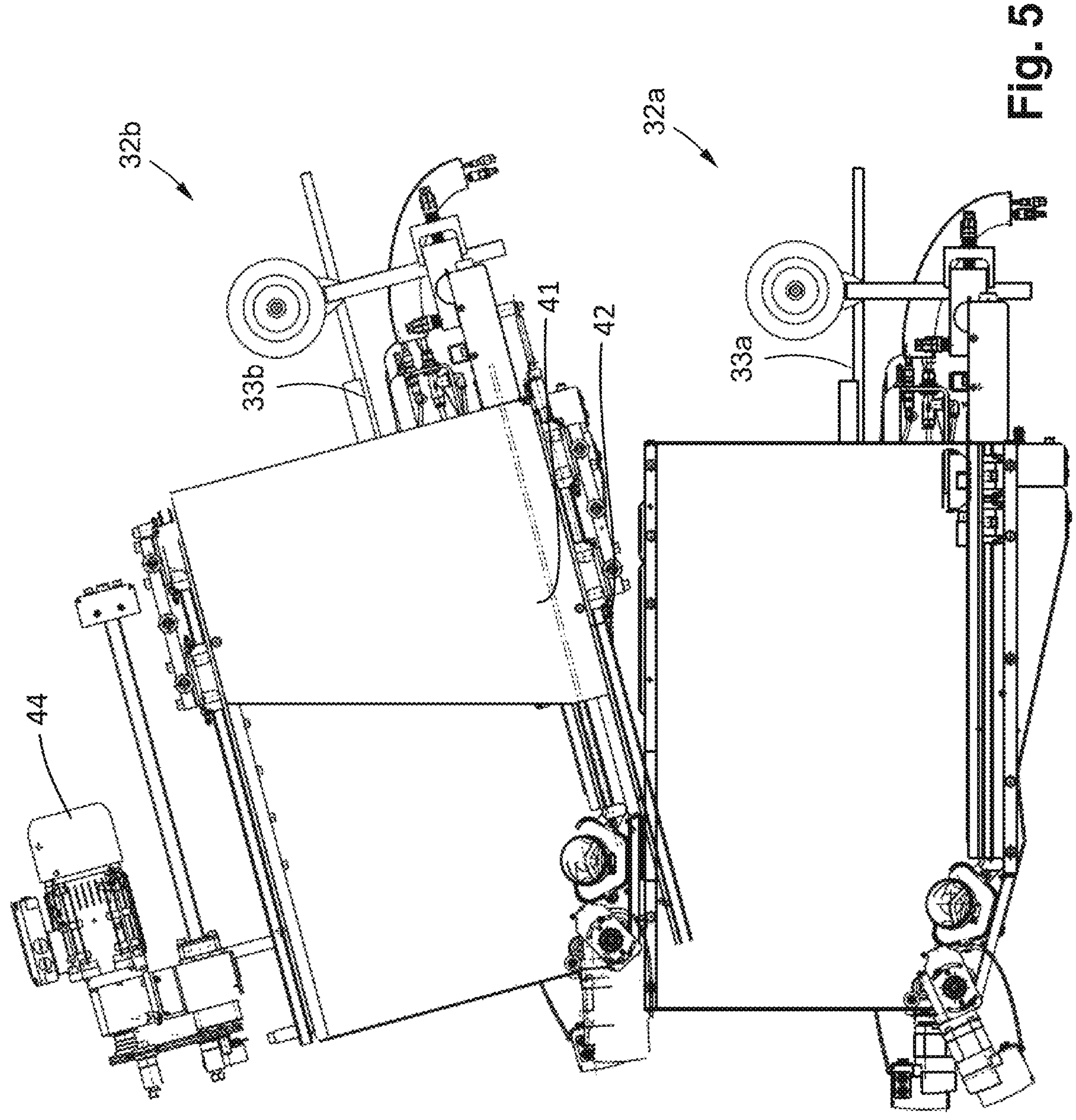
FIG. 5 is a schematic cross-sectional view of a feeder unit according to an embodiment of the present invention.

As best seen in FIGS. 3 to 5, the upper feeder device 32*b* is slidably mounted to a structural frame 40 of the blank joining module 10. The connection between the upper feeder device 32*b* and the structural frame 40 may be achieved with a sliding connection. The sliding connection may comprise a slide rail 42 and a slider 41. The upper feeder device 32*b* can be displaced along the slide rail 42 by a motor 44. The motor 44 may perform an automatic displacement of the upper loading surface 33*b*. The control circuitry 80 of the blank joining module 10 may automatically operate the motor 44 to displace the upper feeder device 32*b* to a predetermined operating position calculated from the longitudinal length La of the lower blank 2*a* in the lower feeder device 32*a*. The longitudinal length La is the length of the lower blank 2*a* in the direction of transportation T.

To further facilitate the access to the upper feeder device 32*b*, the blank joining module 10 may further comprise a modular podium 50. As best seen in FIG. 3, the podium 50 comprises at least one stepping surface 52*a*. Preferably the podium 50 comprises a second stepping surface 52*b* movably arranged on top of the first stepping surface 52*a*.

As illustrated in FIG. 4, the alignment unit 34 is arranged downstream (in the direction of transportation T) of the feeder unit 32 and is configured to laterally align the upper blank 2*b* and the lower blank 2*a* to their respective predefined lateral positions. In such a way, the upper blank 2*b* and the lower blank 2*a* are in the correct lateral positions when the blanks 2*a*, 2*b* are brought into contact with each other in a junction point J.

The alignment unit 34 comprises an upper alignment device 34*b* configured to align the upper blank 2*b* and a lower alignment device 34*a* configured to align the lower blank 2*a*. The upper and lower alignment devices 34*b*, 34*a* are provided with a respective distal upstream connection end 35*b*, 35*a* which is preferably fixedly connected to the upper and lower feeder devices 32*b*, 32*a*.

Figure 7:
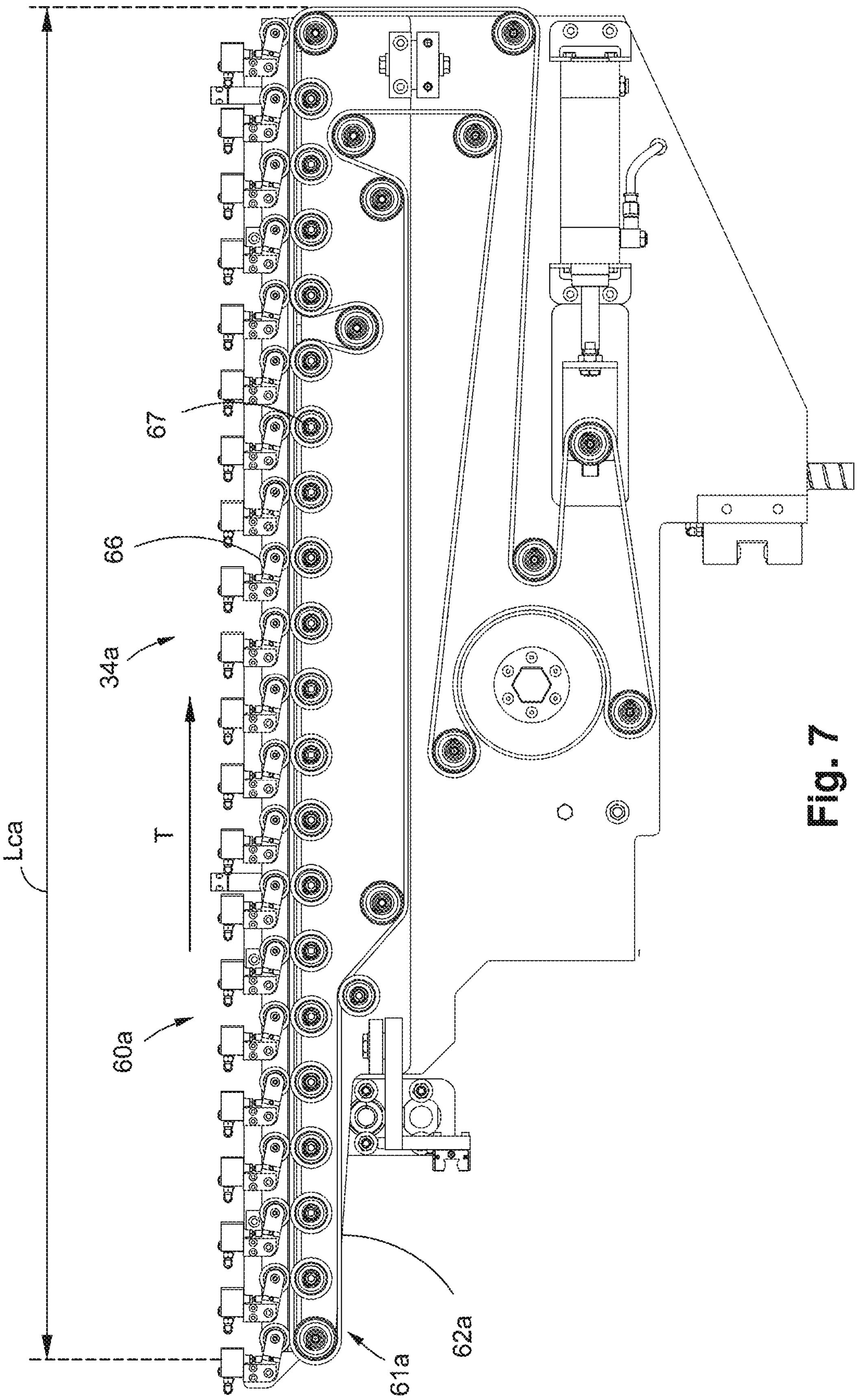
FIG. 7 is a schematic cross-sectional view of a lower alignment device according to an embodiment of the present invention.

The lower alignment device 34*a* is configured to transport the lower blank 2*a* along a substantially horizontal transportation path Pa. As best seen in FIG. 7, the lower alignment device 34*a* comprises an upper pressing member 60*a*, a lower conveyor 61*a* and a guide (not shown). The lower conveyor 61*a* comprises an endless conveyor belt 62*a* having a contact length Lca configured to be in contact and drive the lower blank 2*a* forward in the direction of transportation T.

As best seen in FIGS. 8*a* to 8*d*, the upper alignment device 34*b* comprises an upper pressing member 60*b*, and an upper conveyor 61*b*. A guide 63 is arranged such that it is straight in the direction of transportation T. The upper pressing member 60*b* and the upper conveyor 61*b* are arranged at an angle in the direction of transportation T such as to direct a lateral edge of the lower blanks 2*a* against the guide 63. The upper conveyor 61*b* comprises an endless conveyor belt 62*b* having a contact length Lcb configured to be in contact and drive the upper blank 2*b* forward in the direction of transportation T.

The upper alignment device 34*b* is thus configured similarly to the lower alignment device 34*a*. However, the upper alignment device 34*b* is provided with a variable contact length Lcb in the direction of transportation T. The upper alignment device 34*b* further comprises a mobile distal end 35*a* connected to the upper feeder device 32*b* and a fixed distal end 37*b* connected to the structural frame 40 of the blank joining module 10. This allows the displacement of the upper feeder device 32*b* in the longitudinal direction L while maintaining a fixed connection to the upper alignment device 34*b*.

Figure 8A:
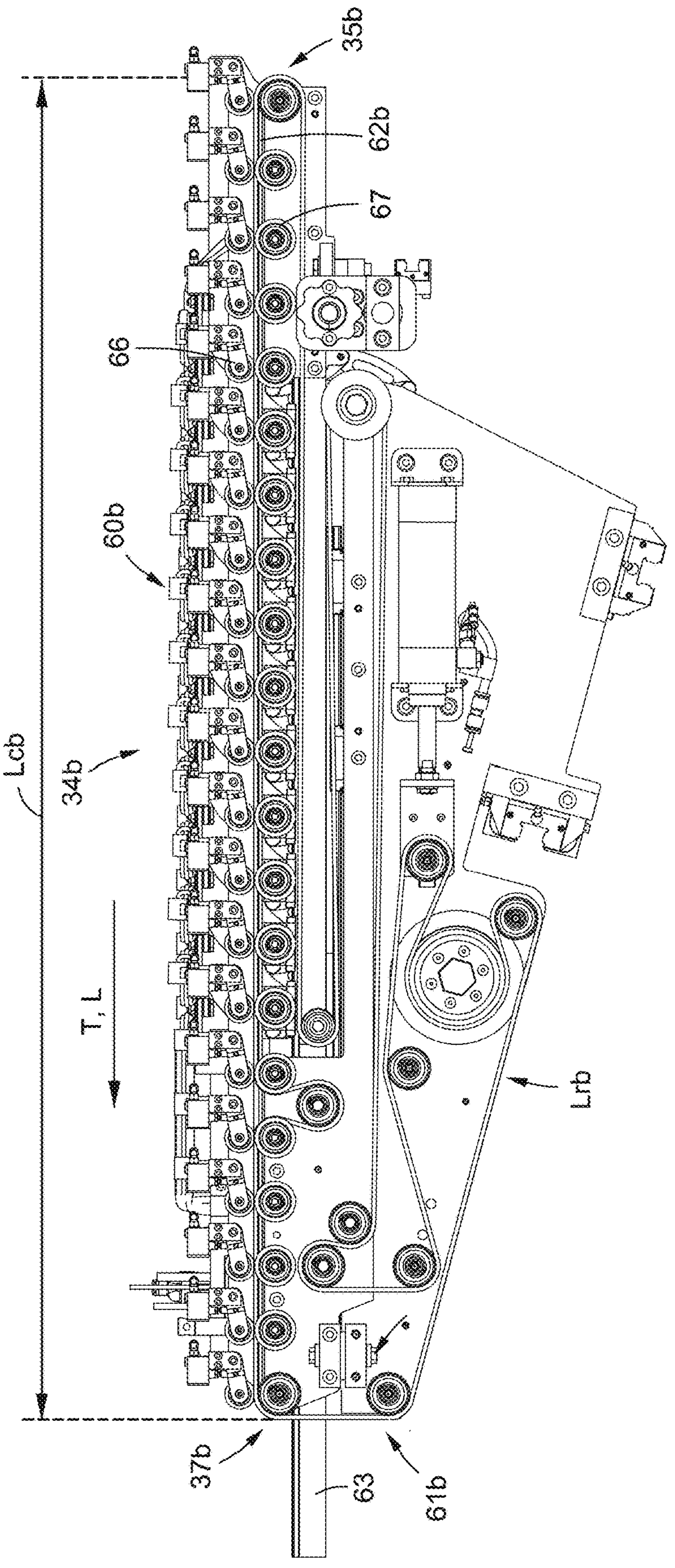
FIGS. 8*a* and 8*b* are schematic cross-sectional side views of an upper alignment device according to an embodiment of the present invention.
Figure 8B:
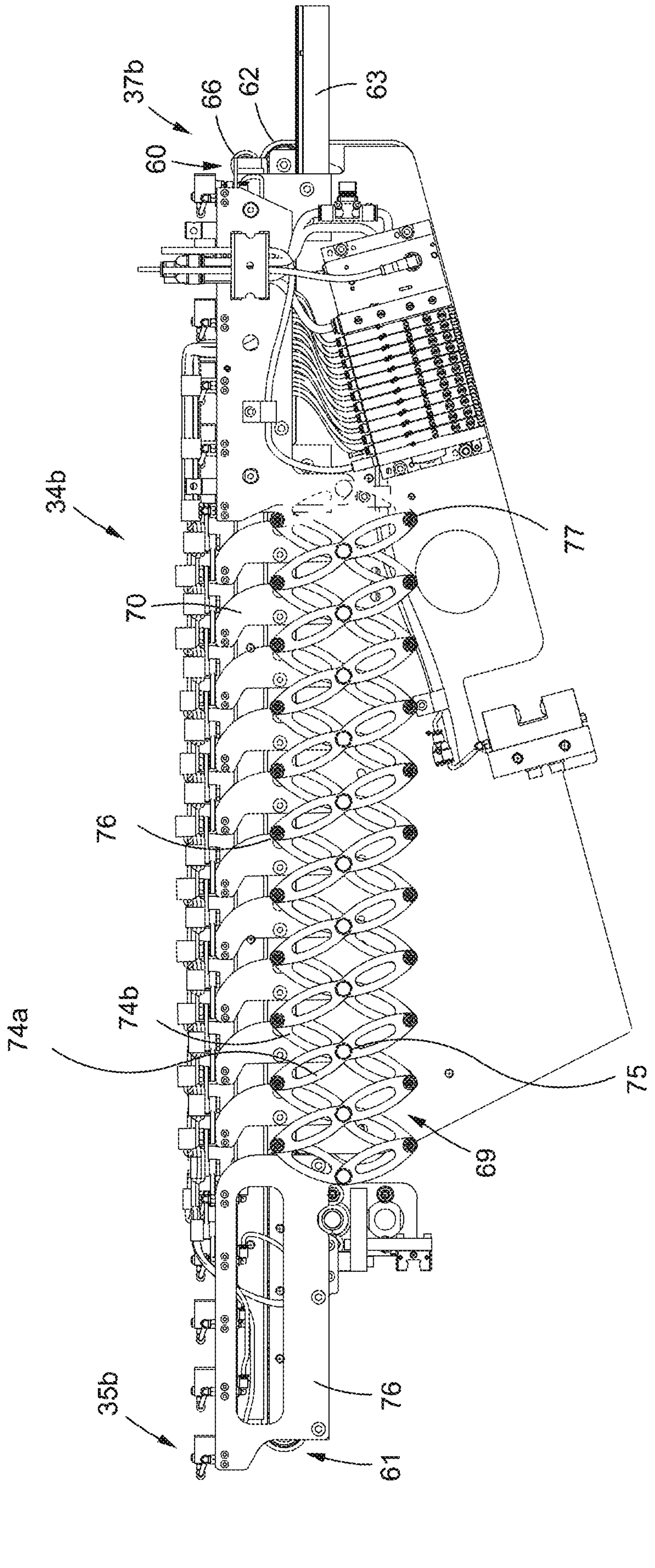
Figure 8C:
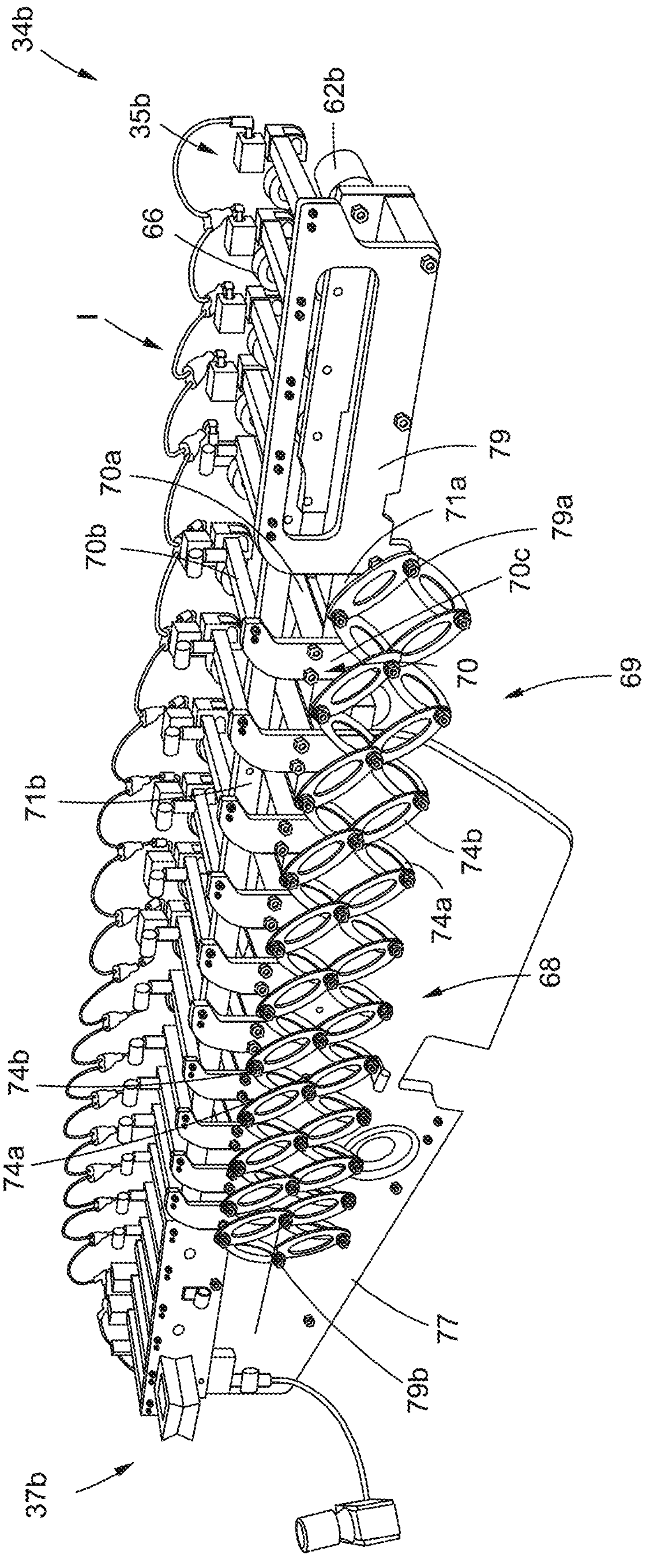
FIG. 8*c* is a schematic perspective view of the upper alignment device of FIGS. 8*a* and 8*b*.
Figure 8D:
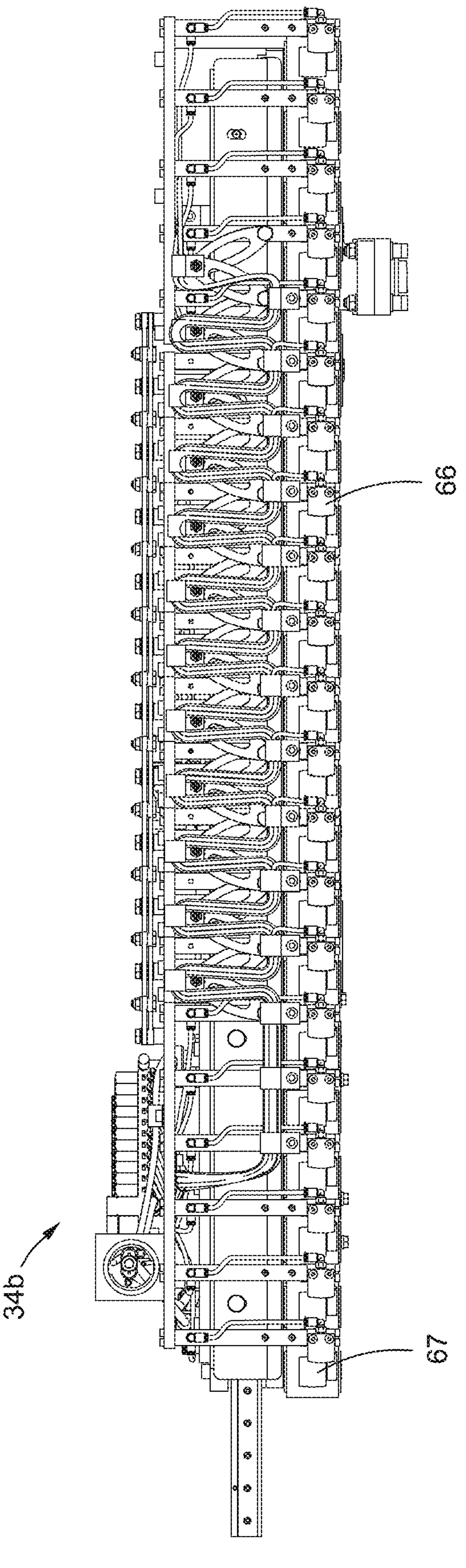
FIG. 8*d* is a top view of the upper alignment device of FIGS. 8*a* to 8*c*.

As best seen in FIGS. 8*b* and 8*c*, the upper conveyor 61*b* of the upper alignment device 34*b* further comprises a support structure 69 configured to support the conveyor belt 62*b*. The support structure 69 comprises a plurality of rollers 67 (see FIG. 8*a*) onto which the conveyor belt 62*b* is mounted. The rollers 67 are attached to frame members 70 and a connection mechanism 68 is connecting adjacent frame members 70 to each other. The connection mechanism 68 is expandable such that the distance between the frame members 70 can be modified. The frame members 70 are displaceable in the direction of transportation T. Each roller 67 is attached to a frame member 70 and arranged in a line.

Preferably, the connection mechanism 68 comprises a plurality of pivotable links 74*a*, 74*b* which allow an equidistant displacement of the frame members 70. The pivotable connection links 74*a*, 74*b* can be provided by two linear elements. The pivotable connection links 74*a*, 74*b* are connected to each frame member 70 in a central pivot 75. The pivotable connection links 74*a*, 74*b* are also connected to each other in an upper pivot 76 and a lower pivot 77. The upper pivot 76 and the lower pivot 77 are movable in the longitudinal direction L.

By connecting the frame members 70 to the central pivot 66, the horizontal position of the central pivot 75 is kept constant. The support structure has a first distal end 35*b* connected to the upper feeder device 32*b* and a second distal end 37*b* connected to the frame 40 of the blank joining module 10.

The frame members 70 are connected to the central pivot 75 of the connection mechanism 68. The frame members 70 comprise a first cantilevered extension 70*a* and a second cantilevered extension 70*b* which are connected to a frame member bracket 70*c*.

The guiding rollers 67 of the conveyor belt 62*b* are attached to the first cantilevered extension 70*a*, and the pressing rollers 66 are attached to the second cantilevered extension 70*b*. The first and second cantilevered extensions 70*a*, 70*b* extend horizontally and parallel in relation to each other. The second cantilevered extension 70*b* is arranged vertically above the first cantilevered extension 70*a*.

The second cantilevered extension 70*b* may be supported by an upper guide rail 71*b* and the second cantilevered extension 70*b* may be supported by a lower guide rail 71*a*. The guide rails 71*a*, 71*b* may be in the form of longitudinal bars arranged underneath the first and second cantilevered extensions 70*a*, 70*b*, respectively.

The distal inlet end 35*b* of the upper alignment device 34*b* may comprise an attachment bracket 79 configured to be attached to the upper feeder device 32*b*. The attachment bracket 79 may further provide a fixed structure to form an inlet section I for the upper pressing rollers 66 and supporting rollers 67 of the conveyor belt 62*b*. The attachment bracket 79 provides a fixed connection to the cantilevered extensions 70*b*, 70*c* such that the inlet section I has a constant length, regardless of the extension or retraction of the connection mechanism 68. A distal central pivot 79*a* is attached to the attachment bracket 79. A second distal central pivot 79*b* is attached to a frame member 77 of the upper alignment module 34*b*.

The guide 63 is not present in this inlet section I defined by the length of the attachment bracket 79. In such a way, the upper blanks 2*b* are not guided in the inlet section I. This allows the upper blanks 2*b* to be transported out of the upper feeder device 32*b* before being urged sideways.

The register control arrangement 36 is configured to compensate for longitudinal register displacement shifts in the direction of transportation T and align the upper and lower blanks 2*b*, 2*a* to each other in the direction of transportation T. The longitudinal register displacement shifts are undesired displacements of the blanks 2*a*, 2*b* in relation to their predefined longitudinal register positions Pa_reg, Pb_reg at a certain moment in time.

Both the upper and lower blanks 2*b*, 2*a* are subject to register displacement shifts du to variations in the blank transportation. Such variations may include variations in the feeder discharge time which results in a feeder displacement Δdb_feeder, Δda_feeder at the respective upper and lower feeder devices 32*b*, 32*a*. The discharge time of the upper and lower feeder devices 32*b*, 32*a* may either be in advance or a delay in relation to their predefined discharge times. Another variation is transportation displacements Δdb_transport, Δda_transport, of the upper and lower blanks 2*b*, 2*a* and are due to local wear on conveyor belts and associated support components.

As illustrated in FIGS. 4 and 6, the register control arrangement 36 comprises a sensing system 83, a position correction device 86, and a control circuitry 84. The control circuitry comprises a control unit 91 and a memory 93.

Figure 6A:
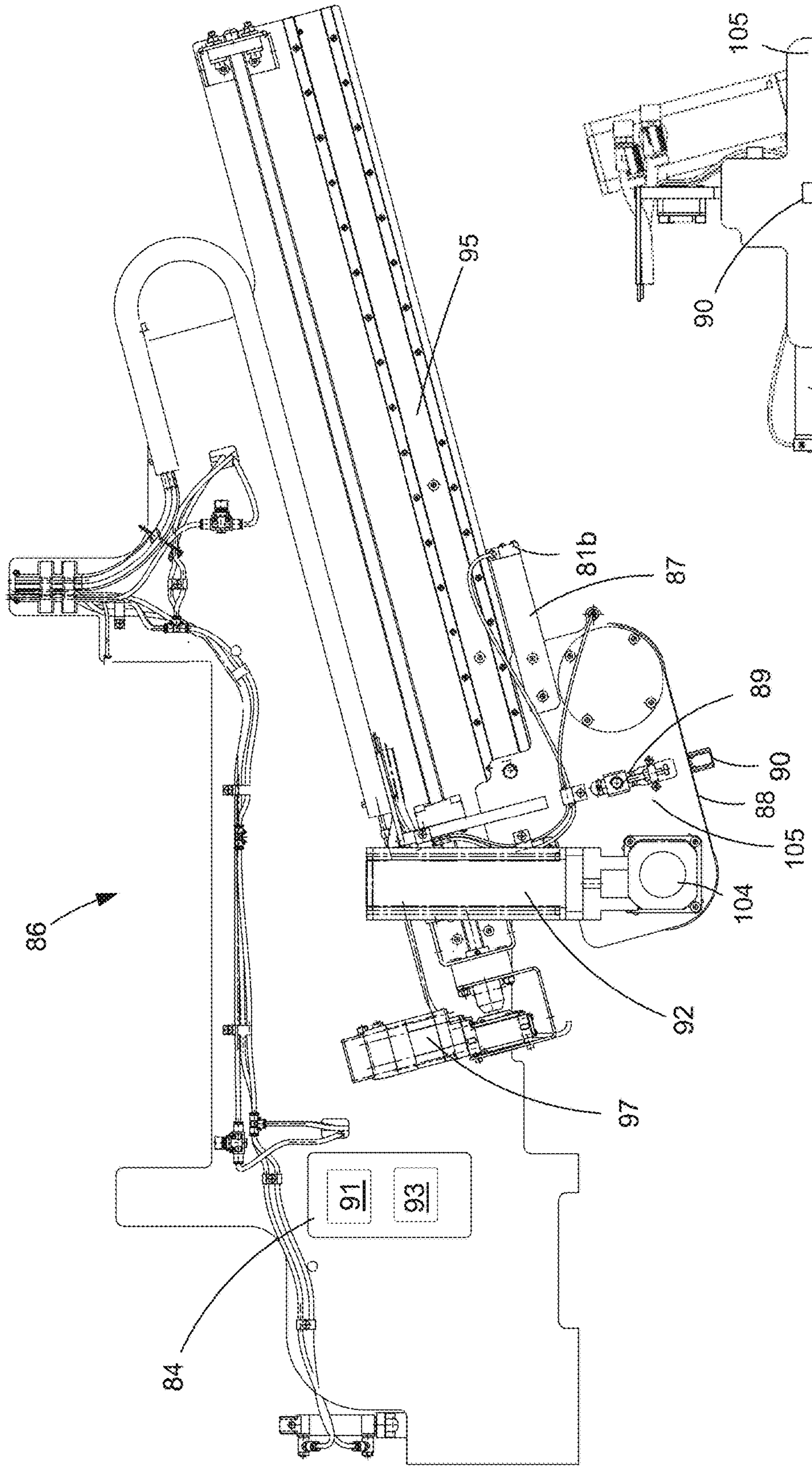
FIG. 6*a* is a schematic cross-sectional view of a position correction device according to an embodiment of the present invention.
Figure 6B:
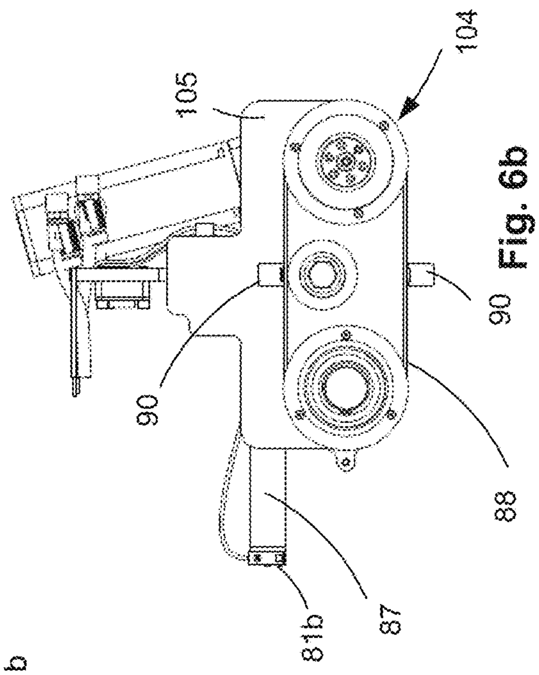
FIG. 6*b* is a detailed view of the position correction device.

As best seen in FIGS. 6*a* and 6*b*, the position correction device 86 comprises a cleat belt 88 mounted on a belt driving mechanism 104. The belt driving mechanism 104 is attached to a frame member 105. The cleat belt 88 is configured to be driven with a variable acceleration and speed. The cleat belt 88 is provided with one or a plurality of abutments 90. Preferably, two abutments 90 are provided. The position correction device 86 further comprises a motor 92 configured to drive the cleat belt 88.

The position correction device 86 may comprise an inductive sensor 89 configured to detect the position of the cleat belt 88 such that the position of the abutments 90 can be determined. The inductive sensor 89 may be configured to sense the abutments 90. The abutments 90 may comprise a metallic material which can be sensed by the inductive sensor 89.

The position of the upper blank 2*b* can be corrected by contacting an abutment 90 against the front edge E1*b* or the rear edge E2*b* of the upper blank 2*b* and either accelerating or decelerating the upper blank 2*b* in the direction of transportation T. Hence, two different operating modes O1, O2 can be provided. In the first operating mode O1, an abutment 90 of the position correction device 86 is contacting the rear edge E2*b* of each upper blank 2*b* and providing an acceleration. In the second operating mode O2, an abutment 90 of the position correction device is contacting the front edge E1*b* of each upper blank 2*b* and providing a deceleration. The location of the position correction device 86 may be different for the two operating modes O1 and O2. The position correction device 86 is preferably positioned closer to the junction point J in the second correction mode O2 than in the first correction mode O1.

The position correction device 86 may be mounted to a slide rail 95. This allows positioning the position correction device 86 according to the type of operating mode O1, O2 and according to the longitudinal length Lb of the upper blank 2*b* in the direction of transportation T. This allows the abutments 90 to be positioned to abut against either of the rear edge E2*b* or the front edge E1*b* of the upper blanks 2*b*.

As illustrated in FIG. 4, the sensing system 83 comprises an upper transfer sensor 81*b* configured to detect the passage of the front leading edge E1*b* of the upper blank 2*b* and a lower transfer sensor 81*a* configured to detect the passage of the front leading edge E1*a* of the lower blank 2*a*. The upper and lower transfer sensors 81*b*, 81*a* are located at a distance upstream from the junction point J.

As best seen in FIG. 6, the upper transfer sensor 81*b* is preferably mounted on a protruding extension 87 of the position correction device 86. The protruding extension 87 may be connected to the frame member 105 of the position correction device 86. The protruding extension 87 positions the upper transfer sensor 81*b* upstream on the cleat belt 88.

The control unit 91 is configured to receive the detection signals from the upper transfer sensor 81*b* and the lower transfer sensor 81*a* and determine the actual positions Pb_act2, Pa_act2 of the upper and lower blanks 2*b*, 2*a*, at each respective transfer sensor 81*a*, 81*b*. The actual positions Pa_act2, Pb_act2 of the upper and lower blanks 2*a*, 2*b* are positions in the direction of transportation T at a predetermined moment in time. The predetermined moment in time can be defined in relation to the time duration elapsed from the issue of a lower feeder discharge signal.

The register control arrangement 36 further comprises an upper register conveyor 78 configured to transport the upper blank 2*b*. A lower transfer conveyor 79 is configured to transport the lower blank 2*a*. The upper register conveyor 78 and the lower transfer conveyor 79 respectively convey the upper blank 2*b* and the lower blank 2*a* towards the junction point J.

The upper blank 2*b* has a transportation path Pb extending from the upper feeder device 32*b* to the junction point J. The lower blank 2*a* has a transportation path Pa extending from the lower feeder device 32*a* to the junction point J.

The upper transportation path Pb has an upper conveyor system 31*b* which comprises the upper alignment device 34*b* and the upper register conveyor 78. The lower transportation path Pa has a lower conveyor system 31*a* which comprises the lower alignment device 34*a* and the lower transfer conveyor 79.

The register control arrangement 36 is preferably configured to only correct the position of the upper blank 2*b*. As the lower blank 2*a* is also subject to register displacement shifts, the actual position Pa_act2 of each lower blank 2*a* at the lower transfer sensor 81*a* is selected as a reference position for each associated upper blank 2*b*. The position of each upper blank 2*b* is modified with the position correction device 86 before the upper blank 2*b* reaches the junction point J.

The detection time from the respective transfer sensors 81*a*, 81*b* define the actual position Pb_act2 and Pa_act2 of the upper and lower blanks 2*b*, 2*a*. The lower transfer sensor 81*a* is located at a distance upstream from the junction point J. As the upper transfer sensor 81*b* is preferably mounted on a protruding extension 87 connected to the position correction device 86, the passage of the upper blank 2*b* can be detected before the upper blank 2*b* is contacted by the cleat belt 88.

The control circuitry 84 is configured to calculate a corresponding desired position Pb_des at the transfer sensor 81*b* of the upper blank 2*b* based on the actual position Pa_act2 of the lower blank 2*a*. The desired position Pb_des of the upper blank 2*b* is the position in which the upper blank 2*b* is aligned with the lower blank 2*a* in the direction of transportation T. That the upper blank 2*b* is aligned with the lower blanks 2*a* means that the upper blank 2*b* is conveyed to be superposed onto the lower blank 2*a* in a position which corresponds to a prescribed assembly position in the direction of transportation T.

The control unit 91 is configured to calculate the desired position Pb_des of each upper blank 2*b* by determining the actual position Pa_act2 for each associated lower blank 2*a* and performing an algorithm stored in the memory 93.

Due to the inclined upper transportation path Pb being longer than the lower transportation path Pa, the actual transportation speed Vb_act of the upper blank 2*b* upstream of the junction point J may be higher than the actual transportation speed Va_act of the lower blank 2*a*.

As the length of the upper transportation path Pb may change depending on the contact length Lcb of the extendable upper alignment device 34*b*, a theoretical transportation speed Vb_t of the upper blank 2*b* can be calculated by the control unit 91 based on the position of the upper feeder device 32*b*. The position of the upper feeder device 32*b* may be determined from the longitudinal length La of the lower blanks 2*a*. The position of the upper feeder device 32 may thus determine the length of the upper transportation path Pb and a theoretical transportation speed Vb_t. The theoretical transportation speed Vb_t. may thereafter be calibrated with the sensing system 83 such that the upper blank 2*b* arrives in a suitable position in relation to the lower blank 2*a*. The suitable position allows a position correction with the position correction device 86.

The position correction device 86 is configured to correct the position of the upper blank 2*b* by either accelerating or decelerating each upper blank 2*b* in the direction of transportation T.

The upper blank 2*b* is preferably conveyed with a selected displacement Δd_selected in the direction of transportation T. The selected displacement Δd_selected is a purposely selected displacement distance in relation to the predefined register position Pb_reg of the upper blank 2*b* at the upper transfer sensor 81*b*. This selected displacement Δd_selected ensures that each upper blank 2*b* consistently arrives with a register displacement distance Δdb at the upper transfer sensor 81*b*.

The selected displacement distance Δd_selected is selected to an amount which can be corrected by the position correction device 86. The displacement distance Δd_selected is preferably between 10 and 15 mm.

This purposely selected displacement distance Δd_selected is either a delay or an advance. The delay means that each upper blank 2*b* consistently arrives too late to the transfer sensor 81*b* in relation to the register position Pb_reg. The advance means that each upper blank 2*b* consistently arrives too early to the transfer sensor 81*b* in relation to the register position Pb_reg.

The selected displacement distance Δd_selected can be provided selecting the actual transportation speed Vb_act of the upper blank 2*b* such that a predefined selected displacement Δd_selected always occurs at the location of the upper transfer sensor 81*b*.

In another and advantageous embodiment, the release timing of the upper feeder device 32*b* can be selected such that the upper blank 2*b* is conveyed with a selected displacement Δd_selected. This displacement is thus effective already when the upper blank leaves the upper feeder device 32*b*. This time deviation is a time delay or a time advance of the upper blank 2*b* in relation to the register position Pb_reg of the upper blank 2*b*.

The upper feeder device 32*b* has a theoretical release time t_b_register such that the upper blank 2*b* is in the register position and aligned with the lower blank 2*a*. Similarly, the lower feeder device has a theoretical release time t_b_register such that the discharge of the lower blank 2*a* is timed and in the register position.

A time deviation Δt_b is thus added to the theoretical release timing t_b_register of the upper blank 2*b*.

The actual release timing tb_actual of the upper blank 2*b* is selected as:

$$tb\_actual = t\_b\_register + \Delta t\_b$$

In this embodiment, the actual transportation speed Vb_act of the upper blank 2*b* is selected such that the upper blank 2*b* is theoretically positioned in the register position and thus arrives at the upper transfer sensor 81*b* in the register position. The actual transportation speed Vb_act on the upper blank 2*b* may be higher than the actual transportation speed Va_actual of the lower blank 2*a*, but only to accommodate for the difference in length between the upper transportation path Pb and the lower transportation path Pa.

At the upper transfer sensor 81*b*, a displacement Δdb of the upper blank 2*b* in relation to the register position Pb_reg of the upper blank can be calculated from the arrival time of the upper blank 2*b* to the upper transfer sensor 81*b*. This is effective regardless if the upper blank 2*b* is provided with a time deviation Δt_b or a transportation speed which gives rise at the selected displacement at the upper transfer sensor 81*b*.

This displacement Δdb includes the selected displacement Δd_selected, the feeder displacement error Δdb_feeder and the transportation displacement Δdb_transportation.

Figure 9:
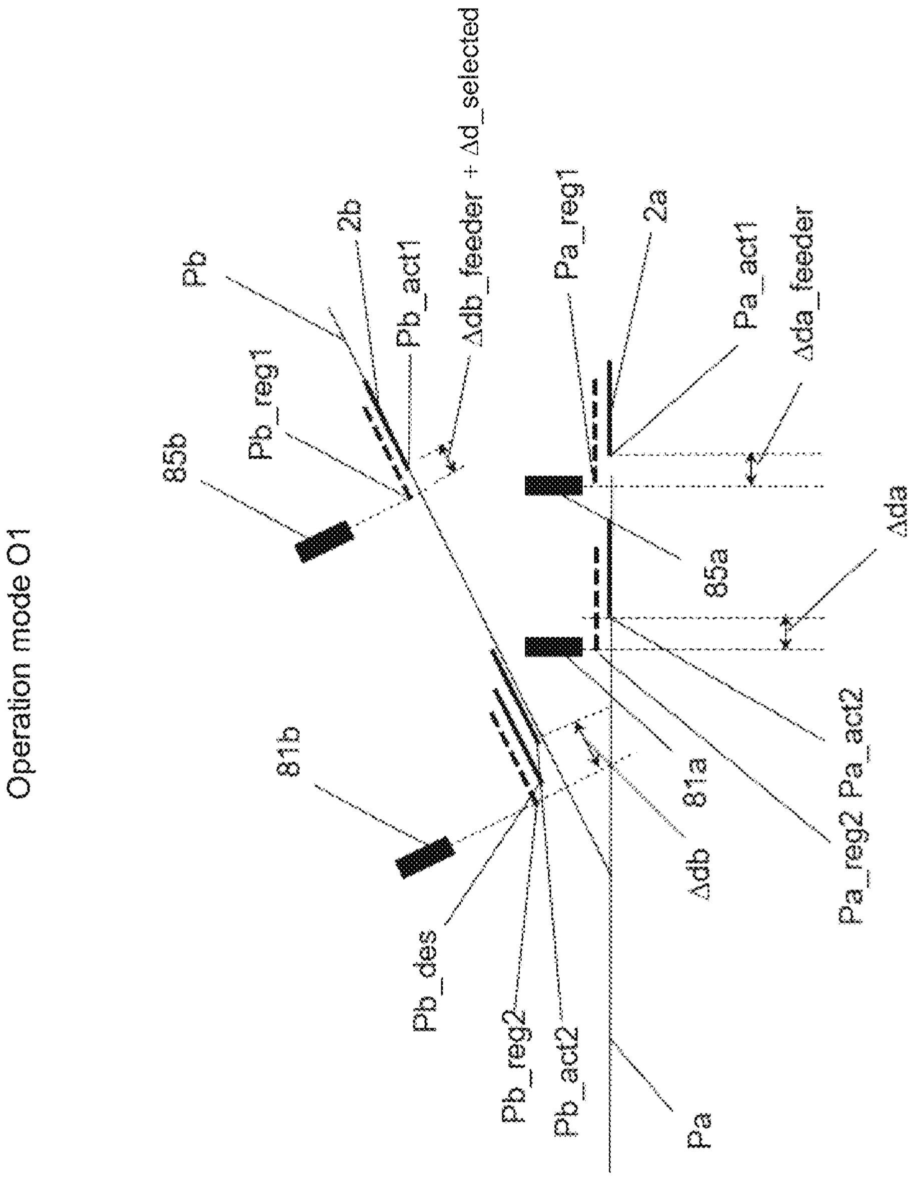
FIG. 9 is a view of a first operation mode of the blank-joining module.

FIG. 9 shows a first operation mode O1 in which the upper blanks 2*b* are conveyed with time deviation Δt_b in the form of a delay added to the release timing tb_actual. Alternatively, the actual transportation speed Vb_act is lower than the theoretical required speed Vb_t. This results in that a predefined and selected negative displacement Δd_selected is added to each upper blank 2*b*. Hence, all upper blanks 2*b* arrive with a time delay at the upper transfer sensor 81*b*.

Figure 10:
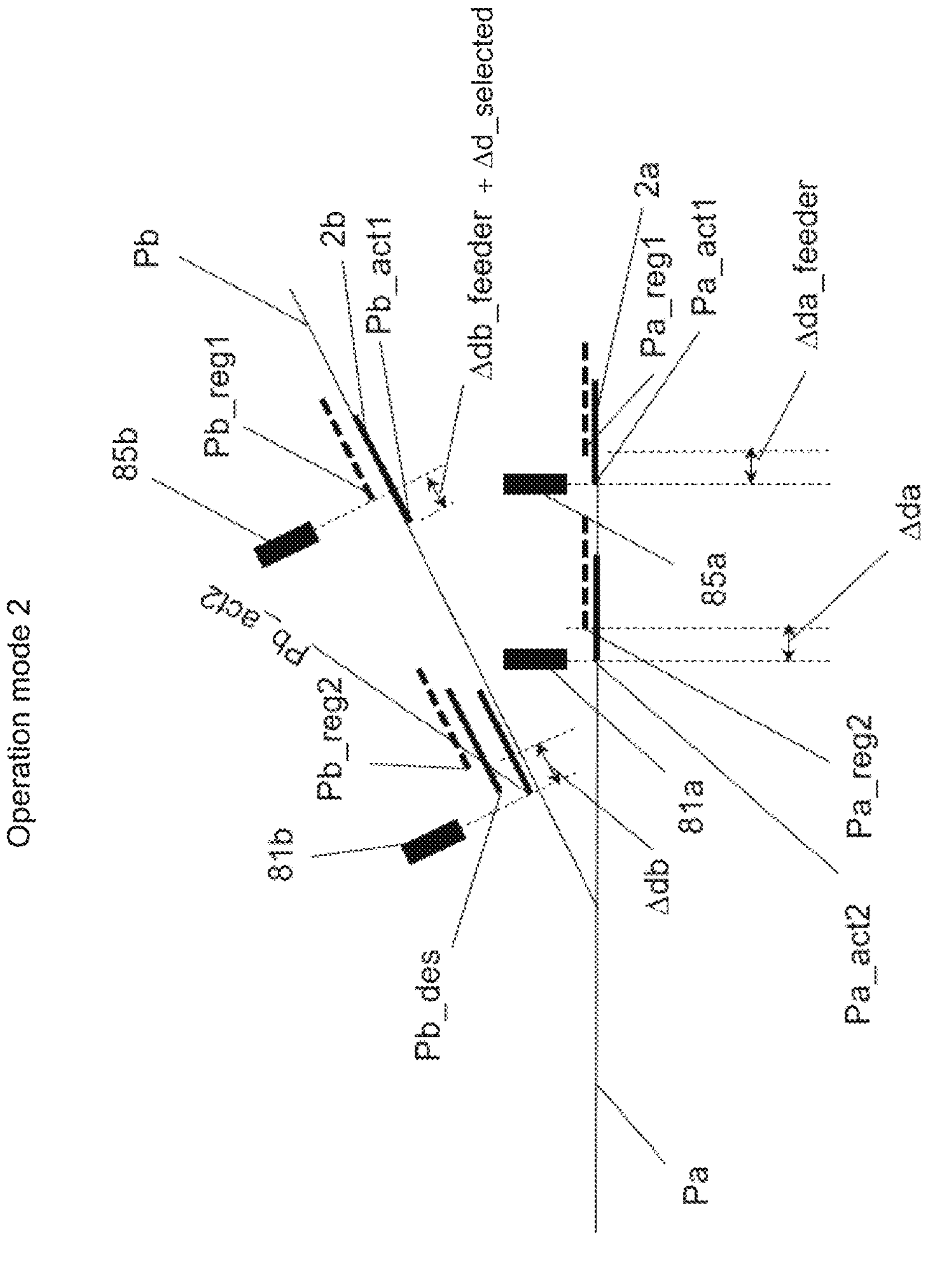
FIG. 10 is a view of a second operation mode of the blank-joining module.

FIG. 10 shows a second operation mode O2 in which the blanks are conveyed with a time deviation in the form of an advance Δt_b added to the release timing tb_actual. Alternatively, the actual transportation speed Vb_act is higher than the theoretical required speed Vb_t. This results in that a predefined and selected positive displacement Δd_selected is added to each blank. Hence, all upper blanks 2*b* arrive with an advance at the upper transfer sensor 81*b*.

In the illustrated modes O1, O2 of FIGS. 9 and 10, the upper blank 2*b* has received a time deviation Δt_b, and the selected displacement Δd_selected is effective already at the upper feeder device 32*b*. If the actual transportation speed Vb_act is selected such create a displacement Δd_selected, the displacement Δd_selected, is preferably gradual and is effective in its full amount at the upper transfer sensor 81*b*.

The sensing system 83 may further comprise an upper feed sensor 85*b* located at a distance downstream of the upper feeder device 32*b*, and a lower feed sensor 85*a* located at a distance downstream of the lower feeder device 32*a*.

The upper and lower feed sensors 85*b*, 85*a* detect the passage of the front leading edges E1*b*, E1*a* of the upper and lower blanks 2*b*, 2*a*, respectively. The passage of the front leading edges E1*b*, E1*a* of the upper and lower blanks 2*b*, 2*a* can be used in order to determine the actual positions Pb_act1, Pb_act1 of the blanks 2*b*, 2*a* at the respective feed sensors 85*b*, 85*a* and as they are discharged from the upper and lower feeder devices 32*b*, 32*a*. In the embodiment where a time deviation is provided to the upper blank 2*b*, the feeder displacement Δdb_feeder and the actual position Pb_act1 of the upper blanks 2*b* at the feed sensor 85*b* can be determined by the following relationships:

$$Pb\_act1 = P\_reg1 - \Delta db\_feeder - \Delta d\_selected$$

$$\Delta db\_feeder = Pb\_act1 - Pb\_reg1$$

The actual position Pa_act1 and the feeder displacement Δda_feeder of the lower blanks 2*a* at the lower feed sensor 85*a* can be determined by the following relationships:

$$Pa\_act1 = P\_reg1 - \Delta da\_feeder$$

$$\Delta da\_feeder = Pa\_act1 = P\_reg1$$

Based on the actual positions Pb_act1, Pb_act1 provided by the upper and lower feed sensors 85*b*, 85*a*, an initial relative displacement Δdb_initial of the upper blank 2*b* in relation to the lower blank 2*a* can be calculated. Based on the initial relative displacement, a preliminary required correction of the abutment 90 on the cleat belt 88 can be determined. Hence, $$\Delta db\_initial = \Delta db\_feeder - \Delta da\_feeder$$

This initial preliminary required correction Δdb_initial is advantageous to calculate as the feeder displacements Δda_feeder, Δdb_feeder are often higher than the transportation displacements Δda_transportation Δdb_transportation. Based on the initial preliminary required correction Δdb_initial, the control unit 91 may determine if the position correction device 86 is able to correct the for the initial preliminary required correction Δdb_initial. If the required correction Δdb_initial is larger than a correction threshold T_corr of the position correction device 86, the control unit 91 may generate a control signal to issue a warning or turn off the converting machine 1.

The register displacement Δda of the lower blank 2*a* at the lower transfer sensor 81*a* is calculated from the difference between the detected actual position Pa_act2 and a corresponding register position Pa_reg2 of the lower blank 2*a*. Hence, the following relationships apply:

$$\Delta da = Pa\_act2 - Pa\_reg2$$

$$\Delta da = \Delta da\_feeder + \Delta da\_transportation$$

For the upper blank 2*b*, the register displacement Δdb at the upper transfer sensor 81*b* and in relation to the predefined register position of the upper blank Pb_reg2 is:

$$\Delta db = Pb\_act2 - Pb\_reg2$$

$$\Delta db = \Delta d\_selected + \Delta db\_feeder + \Delta db\_transportation$$

The displacement Δdb is thus the sum of a feeder register displacement Δd_feeder, a transportation displacement and the selected predefined displacement Δd_selected for the upper blank 2*b*.

The total relative displacement Δdb_total of the upper blank 2$b$ in relation to the lower blank 2$a$ at transfer sensors 81$a$, 81$b$ is the register displacement Δdb of the upper blank 2$b$ subtracted by the register displacement Δda of the lower blank 2$a$.

The total relative displacement Δdb_total between the upper blank 2$b$ and the lower blank 2$a$ at the position of the upper and lower transfer sensors 81$b$, 81$a$ can thus be calculated as follows:

$$\Delta\text{db\_total} = \Delta db - \Delta da$$

The position correction device 86 is configured to provide a displacement correction Δc to every blank 2$b$ in the direction of transportation T. The correction Δc equals the total relative displacement Δdb_total. In such a way, the upper blank 2$b$ is displaced into the desired position P_des_b determined by the control unit 91. Hence, $$\Delta c = \Delta\text{db\_total}$$

In the first operation mode O1, the position correction device 86 is configured to accelerate the upper blanks 2$b$ in order to provide a position correction Δc to each blank 2$b$. In the first operation mode O1, the position correction device 86 is positioned such that the abutment 90 contacts the rear edges E2$b$ of the upper blanks 2$b$.

In the second operation mode O2, the position correction device 86 is configured to decelerate the upper blanks 2$b$ in order to provide a position correction Δc to each blank 2$b$. The position correction device 86 thus decelerates each upper blank 2$b$ before it arrives to the junction point J.

In the first operating mode O1, and for upper blanks 2$b$ with a small longitudinal length Lb, the position correction device 86 is preferably positioned closer to the junction point J than for longer blanks 2$b$.

Providing two modes of operation O1, O2 may also allow the position correction device 86 to be set to abut against the most suitable edge of the front edge E1$b$ and the back edge E2$b$. Ideally, the most suitable edge is a straight or a uniform edge.

The position correction device 86 may further comprise a displacement motor 97 configured to automatically displace the position correction device 86 along the slide rail 95. The longitudinal position of the position correction device 86 is selected based on the type of correction mode O1, O2 and the longitudinal length of the upper blank Lb.

The blank joining module 10 further comprises a gluing device 100 arranged upstream of the junction point J. The gluing device may comprise a glue reservoir, a pump and a dispensing nozzle. Preferably, the gluing device 100 is arranged to dispense glue on the top side of the lower blank 2$a$ such that the glue is positioned in-between the upper blank 2$b$ and the lower blank 2$a$. The gluing device 100 is preferably activated based on the detection time of the lower transfer sensor 81$a$.

The invention claimed is:

1. A blank joining module comprising:

an upper feeder device configured to feed an upper blank, a lower feeder device configured to feed a lower blank, an upper conveyor system configured to transport the upper blank from the upper feeder device, a lower conveyor system configured to transport the lower blank from the lower feeder device, the upper and lower conveyor systems being configured to transport the upper and lower blanks towards a junction point where the upper blank is positioned onto the lower blank, and a register control arrangement comprising a sensing system and a position correction device, wherein the sensing system comprises an upper transfer sensor configured to detect a passage of the upper blank and a lower transfer sensor configured to detect a passage of the lower blank, and wherein the register control arrangement further comprises a control unit and a memory, the control unit being configured to receive detection signals from the upper and lower transfer sensors and calculate a total relative displacement between the upper blank and the lower blank, the control unit being further configured to activate the position correction device to provide a correction displacement to the upper blank such that the upper blank is displaced to be aligned to the lower blank, and wherein the position correction device comprises a cleat belt provided with an abutment, and wherein the control unit is configured to either position the abutment to abut against a front edge or a rear edge of the upper blank such as to modify a position of the upper blank in a direction of transportation.

2. The blank joining module according to claim 1, wherein the upper blank is conveyed with a selected displacement distance, such that each upper blank is displaced in relation to its predefined register position at the upper transfer sensor.

3. The blank joining module according to claim 2, wherein the selected displacement distance is selected such that each upper blank always arrives at a location of the upper transfer sensor with the total relative displacement, in relation to the lower blank and wherein a position of each upper blank is corrected with the position correction device.

4. The blank joining module according to claim 2, wherein the selected displacement distance is selected such that each upper blank needs a correction in a same direction in an upper transportation path.

5. The blank joining module according to claim 1, wherein only a position of the upper blank is corrected.

6. The blank joining module according to claim 1, wherein the lower transfer sensor is configured to detect an actual position of the lower blank before the upper transfer sensor detects an actual position of the upper blank.

7. The blank joining module according to claim 1, wherein an actual speed of the upper blank is different from an actual speed of the lower blank.

8. The blank joining module according to claim 1, wherein an actual release timing of the upper blank or an actual transportation speed of the upper blank is selected such that the upper blank is provided with a selected displacement in relation to a register position of the upper blank.

9. The blank joining module according to claim 1, wherein the position correction device comprises a housing shroud provided with an extension which extends further upstream in the direction of transportation than the cleat belt, and wherein the upper transfer sensor is located on the extension.

10. The blank joining module according to claim 1, wherein the memory comprises a first set of operating instructions for a first operating mode, in which the position correction device is configured to abut against the rear edge of the upper blank such that each upper blank is accelerated by the position correction device, and a second set of instructions for a second operating mode in which the position correction device is configured to abut against the front edge of the upper blank, such that each blank is decelerated by the position correction device.

11. The blank joining module according to claim 10, wherein the position correction device is connected to a displacement mechanism attached to a structural frame of the blank joining module, and wherein the position correction device is displaceable in the direction of transportation such that the position correction device can be moved to a first operating position in the first operating mode and to a second operating position in the second operating mode.

12. The blank joining module according to claim 11, wherein the displacement mechanism comprises a motor and a slide mechanism, and wherein the control unit is configured to actuate the motor to displace the position correction device according to a longitudinal length of the upper blank and a selection of the first operating mode or the second operating mode.

13. The blank joining module according to claim 1, wherein the register control arrangement further comprises an upper feed sensor and a lower feed sensor configured to detect the respective passage of the upper blank and the lower blank, and wherein the control unit is configured to determine an initial relative feeder displacement from a difference in detection times, and wherein the control unit is configured to issue a warning signal if the initial relative feeder displacement is higher than a correction threshold.

14. A blank joining module comprising:

an upper feeder device configured to feed an upper blank, a lower feeder device configured to feed a lower blank, an upper conveyor system configured to transport the upper blank from the upper feeder device, wherein the upper conveyor system comprises an upper alignment conveyor and a register conveyor, and wherein the upper alignment conveyor is connected to the register conveyor and an upper feeder, wherein the upper feeder is movable in a longitudinal direction and wherein the upper alignment conveyor is provided with a variable length, a lower conveyor system configured to transport the lower blank from the lower feeder device, the upper and lower conveyor systems being configured to transport the upper and lower blanks towards a junction point where the upper blank is positioned onto the lower blank, and a register control arrangement comprising a sensing system and a position correction device, wherein the sensing system comprises an upper transfer sensor configured to detect a passage of the upper blank and a lower transfer sensor configured to detect a passage of the lower blank, and wherein the register control arrangement further comprises a control unit and a memory, the control unit being configured to receive detection signals from the upper and lower transfer sensors and calculate a total relative displacement between the upper blank and the lower blank, the control unit being further configured to activate the position correction device to provide a correction displacement to the upper blank such that the upper blank is displaced to be aligned to the lower blank.

15. The blank joining module according to claim 14, wherein the control unit is configured to modify a release time and/or a transportation speed of the upper blank based on the length of the upper alignment conveyor.

* * * * *